(12) United States Patent
Byström (10) Patent No.: US 7,674,085 B2
(45) Date of Patent: Mar. 9, 2010

(54) ARRANGEMENT AND A METHOD TO ATTACH A TOOL TO A LOADER

(75) Inventor: Christer Byström, Umeå (SE)

(73) Assignee: ALO AB, Umea (SE)

( * ) Notice: Subject to any disclaimer, the term of this patent is extended or adjusted under 35 U.S.C. 154(b) by 150 days.

(21) Appl. No.: 11/664,167

(22) PCT Filed: Sep. 20, 2005

(86) PCT No.: PCT/SE2005/001370

§ 371 (c)(1),
(2), (4) Date: Mar. 29, 2007

(87) PCT Pub. No.: WO2006/036103

PCT Pub. Date: Apr. 6, 2006

(65) Prior Publication Data

US 2007/0297888 A1    Dec. 27, 2007

(30) Foreign Application Priority Data

Sep. 29, 2004   (SE) .................................... 0402366

(51) Int. Cl.
    *E02F 9/00* (2006.01)
(52) U.S. Cl. ........................................ 414/723; 37/466
(58) Field of Classification Search ................. 414/722; 37/468
    See application file for complete search history.

(56) References Cited

U.S. PATENT DOCUMENTS

| 5,263,810 A | 11/1993 | Takekata et al. |
| 5,466,113 A * | 11/1995 | Norberg ..................... 414/723 |
| 5,685,689 A * | 11/1997 | Schneider et al. ........... 414/723 |
| 7,001,137 B2 * | 2/2006 | Perrin et al. ................ 414/723 |

FOREIGN PATENT DOCUMENTS

SE    519 997    5/2003

OTHER PUBLICATIONS

International Search Report for PCT/SE2005/001370 mailed Dec. 19, 2005.

* cited by examiner

*Primary Examiner*—Donald Underwood
(74) *Attorney, Agent, or Firm*—Nixon & Vanderhye P.C.

(57) ABSTRACT

An arrangement for a loader makes it possible to attach a tool to the loader. The arrangement comprises a locking arrangement for determining the position of the tool and locking it to the arrangement in this position, and a safety arrangement that ensures that the locking arrangement takes up its locking position only when a tool is correctly arranged at the attachment arrangement. The arrangement includes a part that functions independently of the locking arrangement and that can retain the locking arrangement in an open position that does not perform the locking function, and a releasing part that releases the locking arrangement from the retaining part.

9 Claims, 10 Drawing Sheets

ARRANGEMENT AND A METHOD TO ATTACH A TOOL TO A LOADER

This application is the US national phase of international application PCT/SE2005/001370 filed 20 Sep. 2005, which designated the U.S. and claims priority to SE 0402366-9 filed 29 Sep. 2004, the entire contents of each of which are hereby incorporated by reference.

The present invention concerns an arrangement for a loader and a method for the use of the arrangement.

Several of the loaders that are now available are equipped with an arrangement that is specially intended to aid an operator with the attachment of a tool to the loader.

Some of the tools intended to be used together with loaders of this type have two attachment parts located in the vicinity of an upper part of the tool and a further two attachment parts located in the vicinity of the lower part of the tool and which are to interact with the attachment arrangement on the loader. The upper attachment parts on the tool comprise, for a large proportion of tool units, open hook arrangements.

An attachment arrangement on the loader comprises in turn parts that are located such that they can be brought to interact with the attachment parts of the tool. The attachment arrangement, which is mounted on the arms of the front loader, comprises an attachment rod that extends essentially perpendicularly to the arms of the loader. The attachment rod is designed to interact with the hooks of the tool and in this way to offer a simple and efficient method of attaching the tool to the front loader. The attachment rod may be divided into sections, one section for each hook. The function in this case is, however, the same.

In order to attach a tool to a loader, the driver first places the attachment arrangement of the loader, its attachment rod, in a position in which it interacts with the upper attachment part of the tool, with the hooks. The driver subsequently manoeuvers the arms of the front loader, normally by lifting them, in order to rotate the attachment arrangement of the loaders such that the tool swings around the attachment rod. The lower attachment parts of the tool in this case move in a direction towards other parts of the attachment arrangement of the front loader that are intended to interact with the lower attachment parts of the tool. The lower part of the tool makes contact with a further part of the attachment arrangement of the front loader in order to place the attachment part of the tool in a position with the attachment parts of the attachment arrangement of the front loader.

An adjustable locking arrangement is activated when the attachment arrangement of the tool and the attachment parts of the loader are correctly located relative to each other. Locking elements extend between the parts of the tool and of the loader that fit into each other and join these parts, thus locking the tool to the loader in a secure manner.

Several different types of attachment parts are found on tools and loaders, and several different types of manoeuvring arrangements are used for manoeuvring the adjustable locking arrangements, but the principle of the method is the same.

One problem with these adjustable locking arrangements arises when the locking arrangement has already adopted its locked position before the driver attempts to attach a tool, and the driver is not aware of this. The driver in such a situation connects the hook arrangements of the tool with the attachment rod of the loader in the normal manner, and subsequently raises the loader. The tool swings around the attachment rod under the force of its own weight. Since the locking arrangement is already in its locked position, the lower attachment part of the tool cannot achieve its correct position relative to the corresponding attachment part of the front loader.

The tool is thus attached to the loader solely by the hooks and the attachment rod, and this means that the mounting is not complete. The tool will not remain attached to the loader when an attempt is made to use it. This involves a possible risk situation for people or animals in the vicinity of the machine, since there is a risk that the tool will become detached from the loaders when the driver transports the vehicle or starts work with the tool.

A previously known solution to this problem is a safety arrangement that prevents the attachment arrangement adopting its locked position if a tool is not arranged in the correct manner at the attachment arrangement of the loader. The safety arrangement comprises a latch that can be moved between an active position and an inactive position. When the latch is in its active position, it prevents the adjustable locking arrangement from adopting its locked position. When a tool is to be mounted, the attachment arrangement of the tool displaces the latch from its active position to its inactive position, whereby the locking arrangement is permitted to adopt its locked position.

The actual guiding of the locking arrangement from an open position to a locking position normally takes place manually using a lever or similar, which activates displacement of the locking element. Manual work requires either help from some other person or it requires that the driver climb down from the loader in order to carry out the locking process. This is time-consuming. The guiding can be carried out more or less automatically from the cabin of some loaders. Since parts of the loader still obstruct the sight of the locking arrangement, it is difficult for a driver to see that all parts are in the correct positions, and to initiate the locking procedure at the correct moment from the control cabin of the loader.

One aim of the present invention is to offer an arrangement for a loader and a method for the use of this arrangement that ensures that the task of attaching a tool to the loader is simple, efficient, safe, and that this task is correctly carried out.

This aim is achieved with an arrangement having the technical features that are specified herein and a method used when a tool is to be removed from or attached to an arrangement according to the invention as specified herein.

One embodiment of the invention will be described below with reference to the attached drawings.

Figure 1:
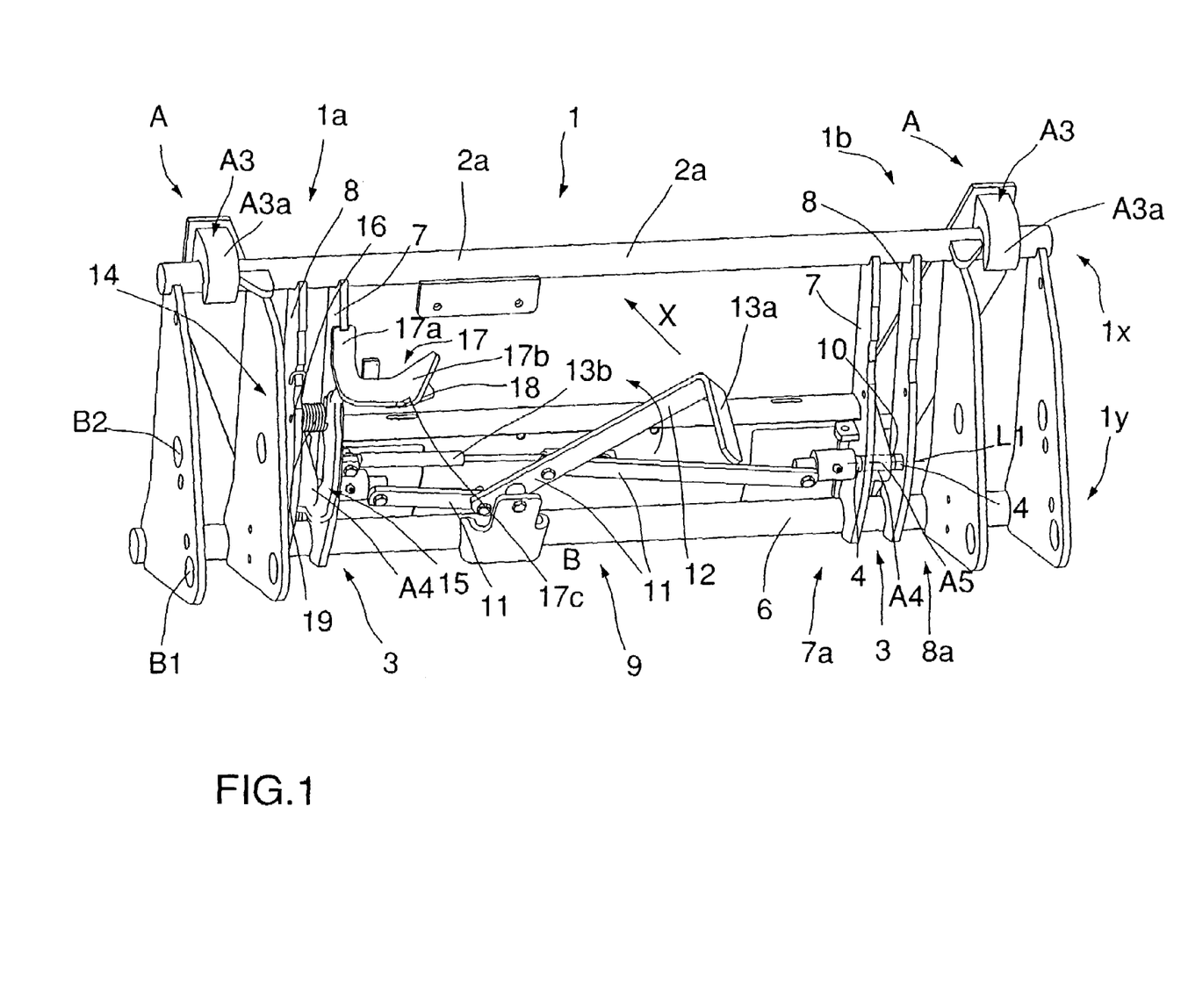
FIG. 1 shows an arrangement according to the invention in its locked position. Only the active parts of the tool are shown.
Figure 4:
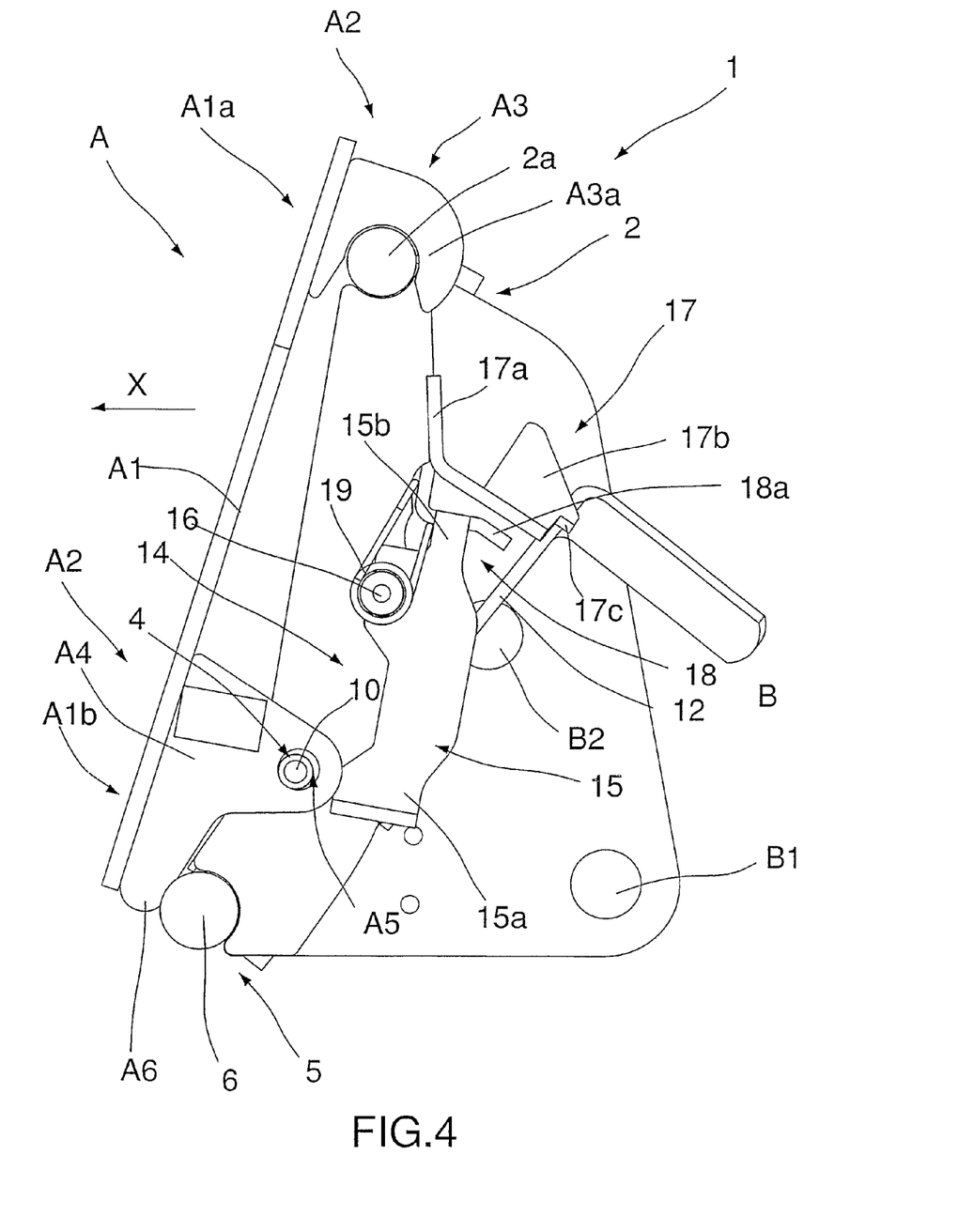
FIG. 4 shows a side view of an arrangement according to the invention in its locked position. Only the active parts of the tool are shown. See also FIG. 1.

An arrangement according to the invention in its fully locked position is shown in FIGS. 1 and 4.

As a general rule, terms such as "downwards" and "lower" will be used in the description to describe displacement towards or location at or in the vicinity of the ground under the loader or tool; while "upwards" and "upper" will be used to describe displacement towards or location at the opposite direction or side. "Forwards" and "forward" and similar descriptions refer to the loader and the front of the loader in its normal direction of travel, and "backwards" and "rear" denote the reverse direction relative to the front and rear of the loader.

The drawings show an arrangement 1 that is to be used mounted on a loader (not shown in the drawings). The arrangement 1 makes it possible to attach a tool A to the loader.

The fundamental principle of the invention is that when a tool A is removed from a loader and an attachment arrangement 1 that belongs to it, parts of the attachment arrangement 1 are arranged in a position such that the attachment arrangement 1 is automatically placed into a locked position when a tool A is again mounted, or a second tool, when the tool A is placed in the correct position in contact with the attachment arrangement 1.

The complete tool A is not shown in the drawings since it may be of any type: a bucket, a gripper, an edged tool, lifting gear, baling equipment, etc. That side of the tool that is turned towards and faces the loader, the rear A1 of the tool, comprises an attachment arrangement A2 that interacts with the attachment arrangement 1 of the loader such that the tool A can be attached to the loader, at the attachment arrangement 1 of the loader.

The attachment arrangement A2 comprises two first identical attachment parts A3, which in turn comprise open hooked fittings A3a, denoted in the remainder of the description by "hooks". These hooks are located in the vicinity of an upper part A1a of the rear A1 of the tool. The first attachment parts A3 are located next to each other, at a distance from each other, in a horizontal plane, when the tool A is seen standing on the ground. See FIG. 4.

Two other identical attachment parts A4, each comprising at least one through hole A5, or an opening or similar, are located in the vicinity of the lower part A1b of the rear. Also these other attachment parts A4 are placed next to each other, at a distance from each other, in a horizontal plane, when the tool A is located standing on the ground. See FIG. 4.

The tool A comprises also a control and support part A6 that interacts with a part of the attachment arrangement 1 of the tool at the point of contact between the tool and the attachment arrangement 1 of the loader in order to determine the position of the tool A with respect to the attachment arrangement 1. See FIG. 4.

The attachment arrangement 1 of the loader interacts with the attachment arrangement A2 of the tool, its attachment parts A3 and A4, and makes it possible to attach the tool A to the loader, at the arrangement 1 of the loader. The attachment arrangement 1 is mounted onto the loader at mount points B1 and B2 at the forward parts of the two arms of the loader. The tool A can be rotated around the mount points B1 and B2 with the aid of control devices, normally cylinder devices, not shown in the drawings, and this makes it possible for a driver of the loader to manoeuvre, control and change the position of the motion of a mounted tool during different tasks carried out by the loader.

The attachment arrangement 1 of the loader comprises parts that are caused to interact with the attachment parts A3 and A4 of the tool. These parts comprise a first, upper, attachment means 2 located in the vicinity of the upper section 1a of the attachment arrangement. It is intended that the upper attachment means 2 interact with the upper attachment part A3 of the tool. The attachment means 2 comprises an attachment rod 2a that extends essentially perpendicularly relative to the normal direction of travel of the loader, see the arrow X in the drawings. It is intended that the attachment rod 2a interact with the attachment parts A3 of the tool, the hooks A3a, in such a manner that the hooks A3a are located above and partially round the attachment rod 2a. The attachment rod 2a lies essentially in a horizontal plane when the tool A is in a position standing on the ground.

The attachment arrangement 1 comprises two second, lower, attachment devices 3 located in the vicinity of the lower section 1b of the attachment arrangement. Each second attachment device 3 is intended to interact with the relevant lower attachment part A4 of the tool. The second attachment device 3 comprises a through opening 4 that extends essentially parallel to the normal direction of motion of the loader, as shown by the arrow X. The opening 4 in the attachment arrangement 1 is to be centred on the hole or opening A5 in the tool A such that the centre axes of the two openings are essentially coaxial.

The attachment arrangement 1 comprises also a guidance arrangement 5 that centres the positions of the attachment arrangement 1 and the tool A relative to each other. The guidance arrangement 5 extends essentially parallel to the attachment rod 2a. The guidance arrangement 5 comprises a positioning rod 6 that is located in the vicinity of the lower section 1b of the attachment arrangement 1. It is intended that the positioning rod 6 interact with the guidance and support part A6 of the tool such that they are placed in contact with each other and control the location of the tool A against the attachment arrangement 1 of the loader.

Frame-forming parts 7 and 8 are arranged at the relevant side section 1a and 1b of the tool, between the attachment rod 2a and the positioning rod 6, on the rear of the attachment arrangement 1, on that side of the attachment arrangement that faces the loader. The frame-forming parts comprise a first 7 and a second 8 strut support that are arranged essentially parallel to each other at a distance from each other. The lower parts 7a and 8a of the frame-forming parts offer attachment points for, or they constitute a part of, the relevant attachment device 3. A through opening 4 is present in the lower parts 7a and 8a of each frame-forming part.

A lock arrangement 9 is arranged at the attachment arrangement 1, principally between the frame-forming parts 7 and 8 at the relevant side section 1a and 1b, at the rear (B) of the attachment arrangement 1, on that side of the attachment arrangement 1 that faces the loader. The lock arrangement 9 comprises actively locking parts 10 that can be displaced between an open position and a locked position, where in the locked position they interact with other parts of the attachment arrangement 1 of the loader and the attachment arrangement A2 of the tool, and connect these to each other.

There are two locking parts 10, and each locking part 10 has an extended shape. The locking parts 10 are arranged to extend through the relevant second attachment means 3, through the relevant opening 4 in the lower parts 7a and 7b of the frame, and onwards into or through the second attachment part A4 of the tool, through or into the hole or opening A5. The locking parts 10 act transverse to the normal direction of motion of the loader, shown by the arrow X, and they hold the tool A locked to the attachment arrangement 1 of the loader.

The lock arrangement 9 comprises a linkage system 11 that joins the locking parts 10 with a part 12 that transfers force. This part 12 makes it possible to transfer force to the locking arrangement 9, a force that displaces the locking parts 10 either into or out from the locked position. The part 12 that transfers force comprises a handle 13a that makes it possible to transfer manually a force in order to control the displacement of the locking parts 10 from the locked position to the open position. The part 12 that transfers force comprises also a part 13b that produces force, such as a gas-powered spring, that acts continuously on the locking arrangement 9 and that transfers a force such that the locking arrangement 9 attempts to reach the locked position.

The attachment arrangement 1 comprises a safety arrangement 14 that acts on the locking arrangement 9 when it is in use, and latches the locking arrangement 9 such that it does not take up its locked position. The safety arrangement 14 is displaced from its active position to an inactive position just as the tool 2 is mounted onto the arrangement 1.

The safety arrangement 14 comprises a latch 15 that can be displaced between an active position and an inactive position. When the latch 15 is in the active position, it prevents the locking arrangement 9 from taking up its locking position. The latch 15 acts on the locking parts 10 of the locking arrangement and prevents their displacement to the locking position, in which the locking parts 10 interact with the attachment arrangement 1 of the loader and the attachment arrangement A2 of the tool. When a tool A is to be mounted, the second attachment arrangement A4 of the tool displaces the latch 15 from its active position to its inactive position whereby the locking arrangement 9, its locking parts 10, are allowed to take up their locking position. The latch 15 is an extended part that is mounted on the attachment arrangement 1 with the aid of a shaft construction 16. The latch 15 can be rotated around the shaft 16 and is then displaced between the active position and the inactive position.

The attachment arrangement 1 comprises a part 17 that is able to retain the locking arrangement 9 in its open position, the position in which it is not locked. The retaining part 17 functions independently of the safety arrangement 14, the latch 15, and it can be released without the safety arrangement 14, the latch 15, being influenced. The retaining part 17 is mounted on the rear of the attachment arrangement 1, on that side of the attachment arrangement 1 that faces the loader. The retaining part 17 comprises an arm construction that is mounted on the attachment arrangement 1 at one of its ends 17a, and whose free end 17b is turned towards and is positioned at the locking arrangement 9, at the part 11 of the locking arrangement that transfers force. The retaining part 17 can be brought to interact with the locking arrangement 9 in a manner that retains interaction, and with the part 11 of the locking arrangement that transfers force, in the vicinity of the handle 13. The free end 17b has a concavity 17c in which a part of the part 11 that transfers force is arranged.

The locking arrangement 9 can be released from this retaining part 17, the part 11 that transfers force can be taken out from the concavity 17c with the aid of a releasing part 18. The releasing part 18 comprises a protruding part 18a that can be caused to guide the part 12 that transfers power out from the concavity 17c and in this way away from the retaining part 17. The locking arrangement 9 can subsequently move towards its locking position as soon as the latch 15 has attained its inactive position.

A part 19 that stores force, a spring, a torsion spring, is arranged to interact with the latch 15. The force of the spring is directed to displace the latch 15 to its active position, to that position in which the motion of the locking arrangement towards its locked position is prevented. The latch 15 is located such that it extends transversely over the direction of travel of at least one locking part 10 of the adjustable locking arrangement.

The part 19 that stores force interacts also with the releasing part 18 and it acts such that the releasing part 18 is to be able to move towards the locking arrangement 9, towards the part 12 that transfers power, such that the retaining effect is broken.

The latch 15 and the releasing part 18 are two parts of the same construction fitting. When the latch 15 is released from the force from the tool A, the part 19 that stores force acts to displace the latch 15 to its active position while at the same time it acts to displace the releasing part 18 in the direction of the locking arrangement 9, towards the part 12 that transfers force in order to displace the locking arrangement 9, the part 12 that transfers force, away from its interaction with the retaining part 17. The part 12 that transfers force and thus the complete locking arrangement 9 are then placed into a condition in which continued motion to the locked position is possible as soon as the locking action of the latch 15 for the locking arrangement 9 is removed by the displacement of the same when the tool A is applied.

The latch 15 is extended with two end sections 15a and 15b and it is attached and mounted in bearings at its central part 15c on the attachment arrangement 1 with the aid of the shaft construction 16. The latch 15 can rotate around the shaft 16 at its central part 15c, which ensures that when the first end 15a, the end that latches the locking arrangement 9, of the latch is displaced, also the second free end 15c of the latch is displaced. The second end 15c of the latch constitutes the releasing part 18.

The operation of the attachment arrangement will now be described.

The Initial Position

The initial position is one in which the tool A is connected with and locked onto the attachment arrangement 1. The tool A is now to be removed and replaced by a second tool, or cleaned and remounted, or similar. The tool A is placed into the location at which it is to be removed, still arranged at the attachment arrangement 1. See FIGS. 1 and 4.

Removal of the Locking Function

Figure 2:
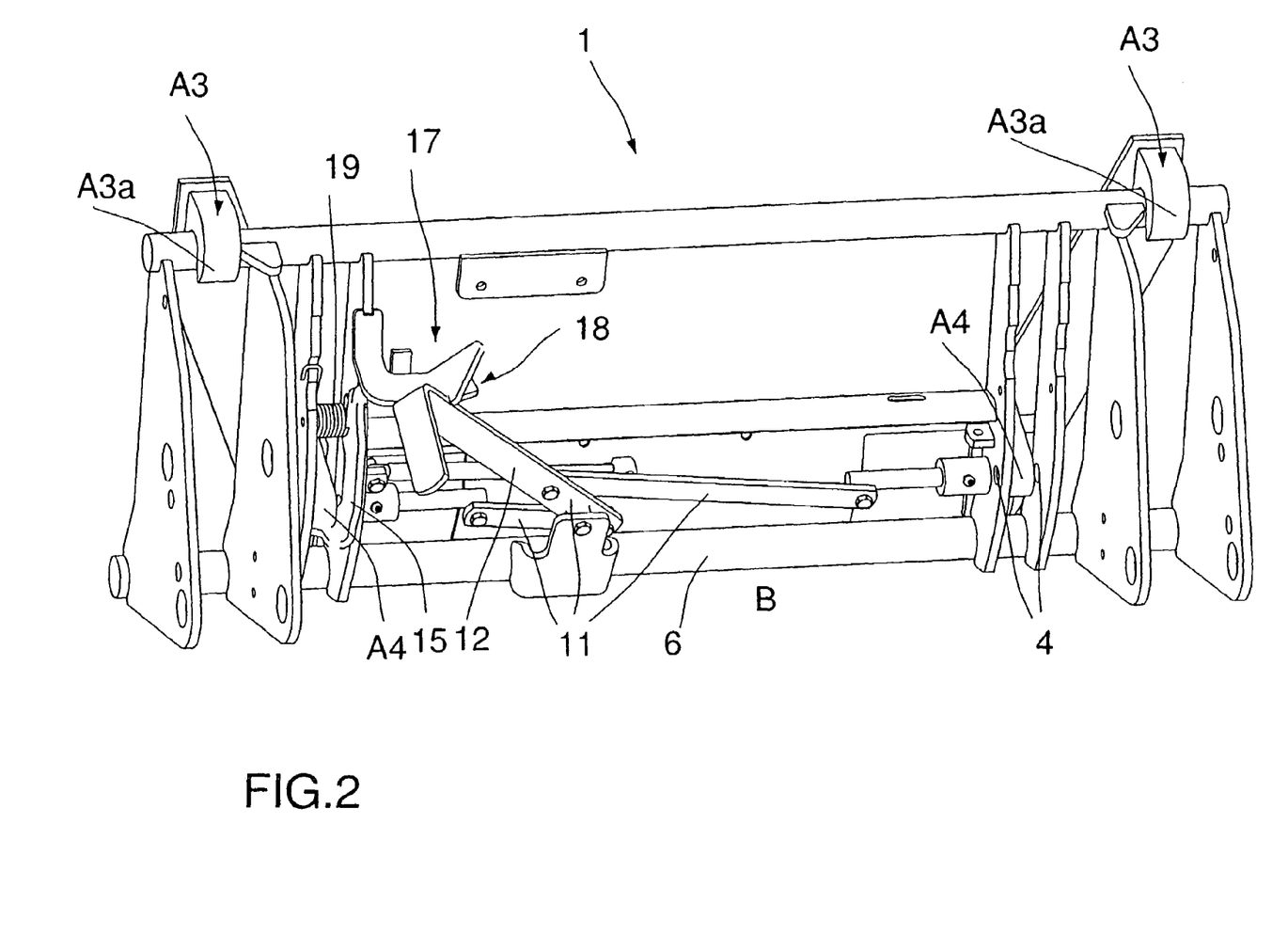
FIG. 2 shows an arrangement according to the invention in its fully open position and with one lock-retaining part in its active position.

The locking arrangement 9 is opened such that the attachment arrangement 1 and the tool A are no longer locked to each other. The part 12 of the locking arrangement 9 that transfers force is displaced by, for example, the handle 13 being gripped by a person, whereupon the locking arrangement 9 is opened. The locking parts 10 are withdrawn from the openings 4 and A5 in the attachment arrangement 1 and the tool A, respectively. The part 12 that transfers power enters a position at which it is retained by the retaining part 17 and the locking arrangement 9 is now in a fully open, not locking, position. This unlocking can take place manually, or it can take place fully or partially automatically. See FIGS. 2 and 5.

Placing the Arrangement into its Automatic Mode

Now that the locking function has been removed, the loader and its attachment arrangement 1 can be displaced away from the tool A. When the attachment arrangement 1 has been displaced away from the tool A the safety arrangement 14 will be released from the influencing force of the tool A. The latch 15 is released from the force that has been applied. The latch 15 is now influenced by the part 19 that stores force such that the latch 15, its first free end 15a, moves towards its active position, to a position in which it prevents the locking arrangement 9 from entering into its locked position. The end 15a of the latch covers the holes 4 and A5 such that the locking part 10 cannot pass in and through these holes. See FIG. 6.

Figure 6:
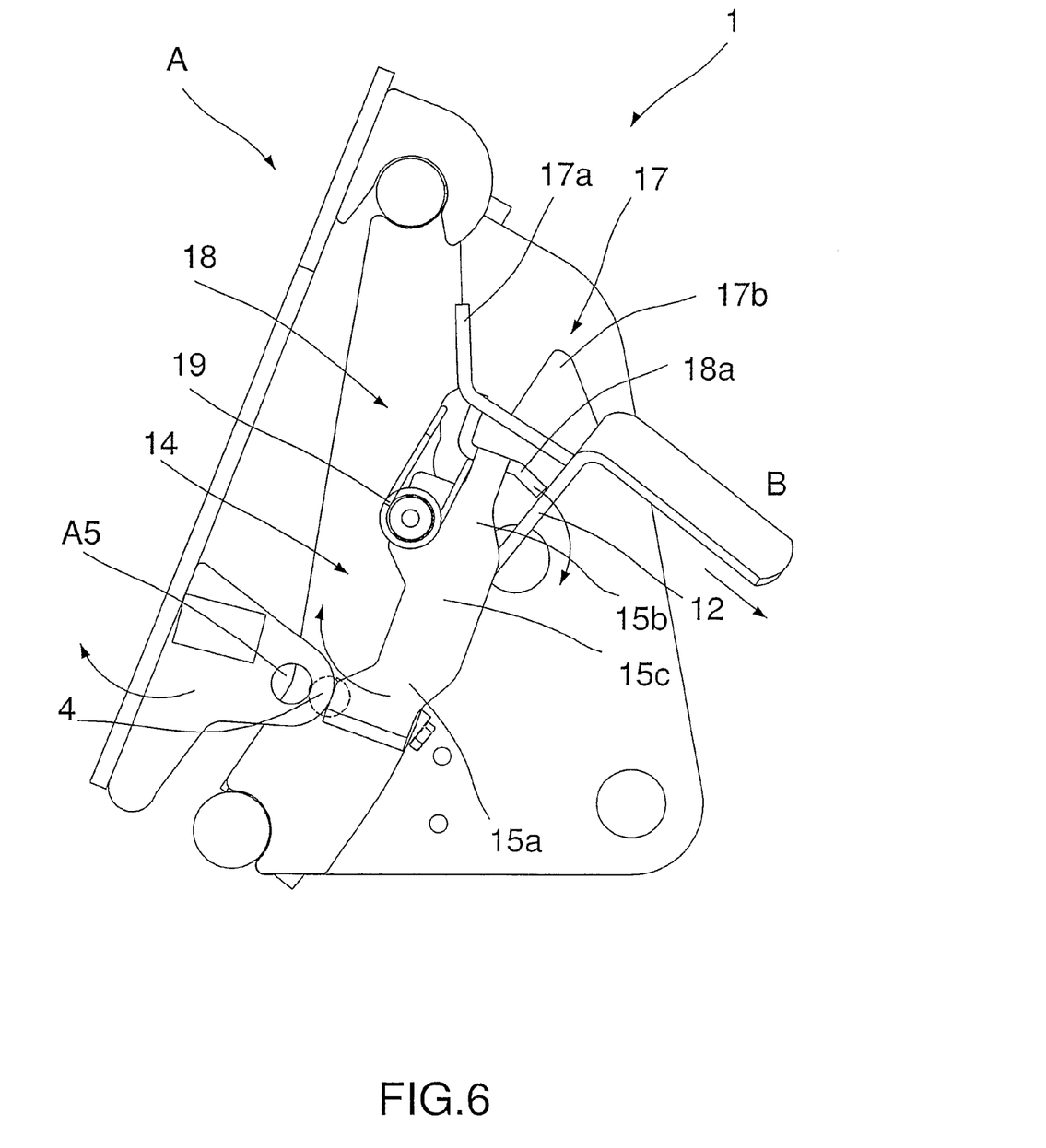
FIG. 6 shows a side view of an arrangement according to the invention where the removal of a tool has been commenced.

The releasing part 18, its extreme end 18a that is equivalent to the second end 15b of the latch, then simultaneously moves towards the part 12 that transfers force and it displaces, pushes, the locking arrangement 9, the part 12 that transfers force, in the direction away from the retaining part 17, whereby the locking arrangement 9, the part 12 that transfers force, is released from the retaining part 17. The safety arrangement 14, and in particular the latch 15, is now the only part that prevents the locking attachment taking up its locked position.

Mounting a Tool

Figure 3:
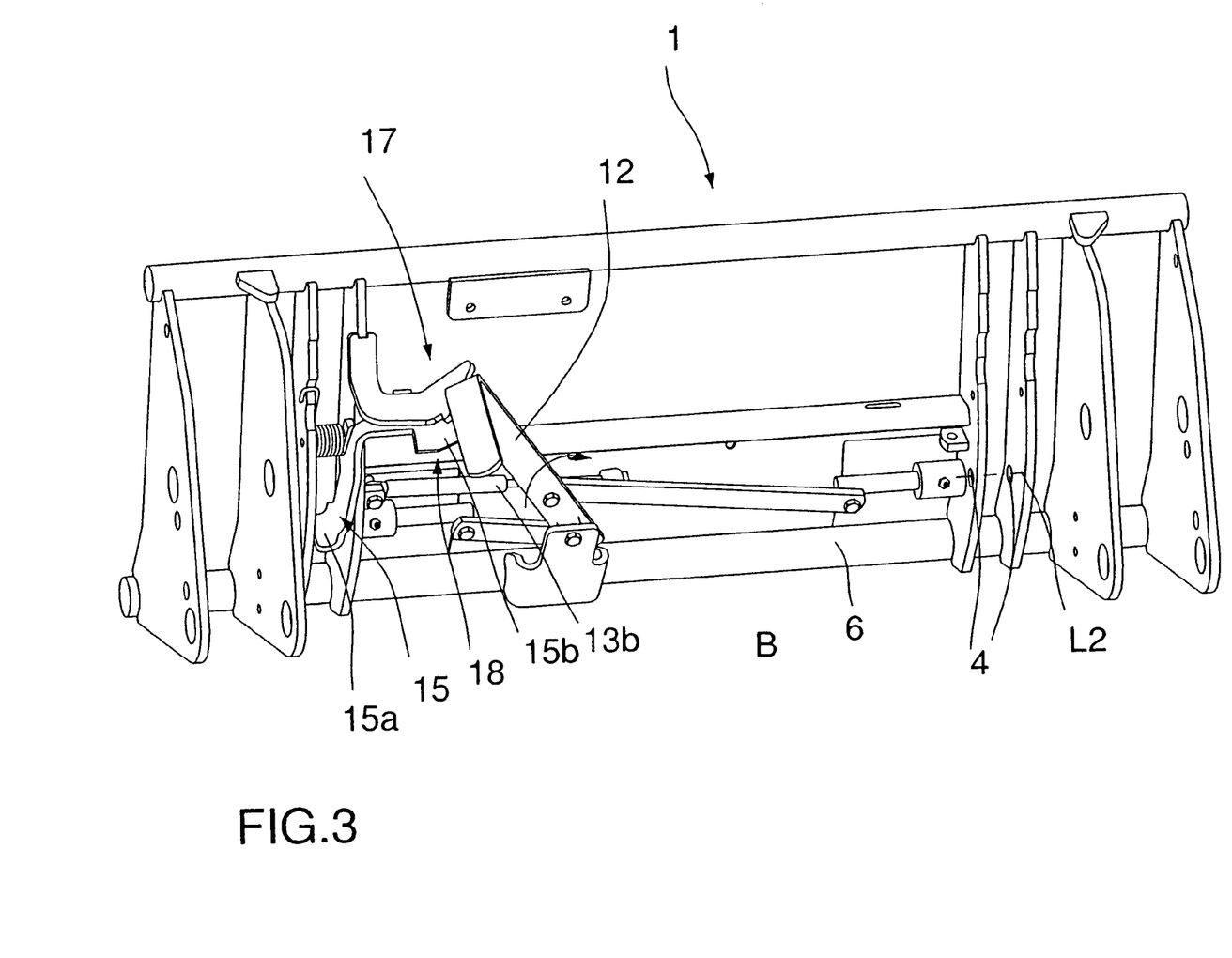
FIG. 3 shows an arrangement according to the invention in a position in which the lock-retaining part is in its inactive position and where the mounting of a tool initiates locking.
Figure 5:
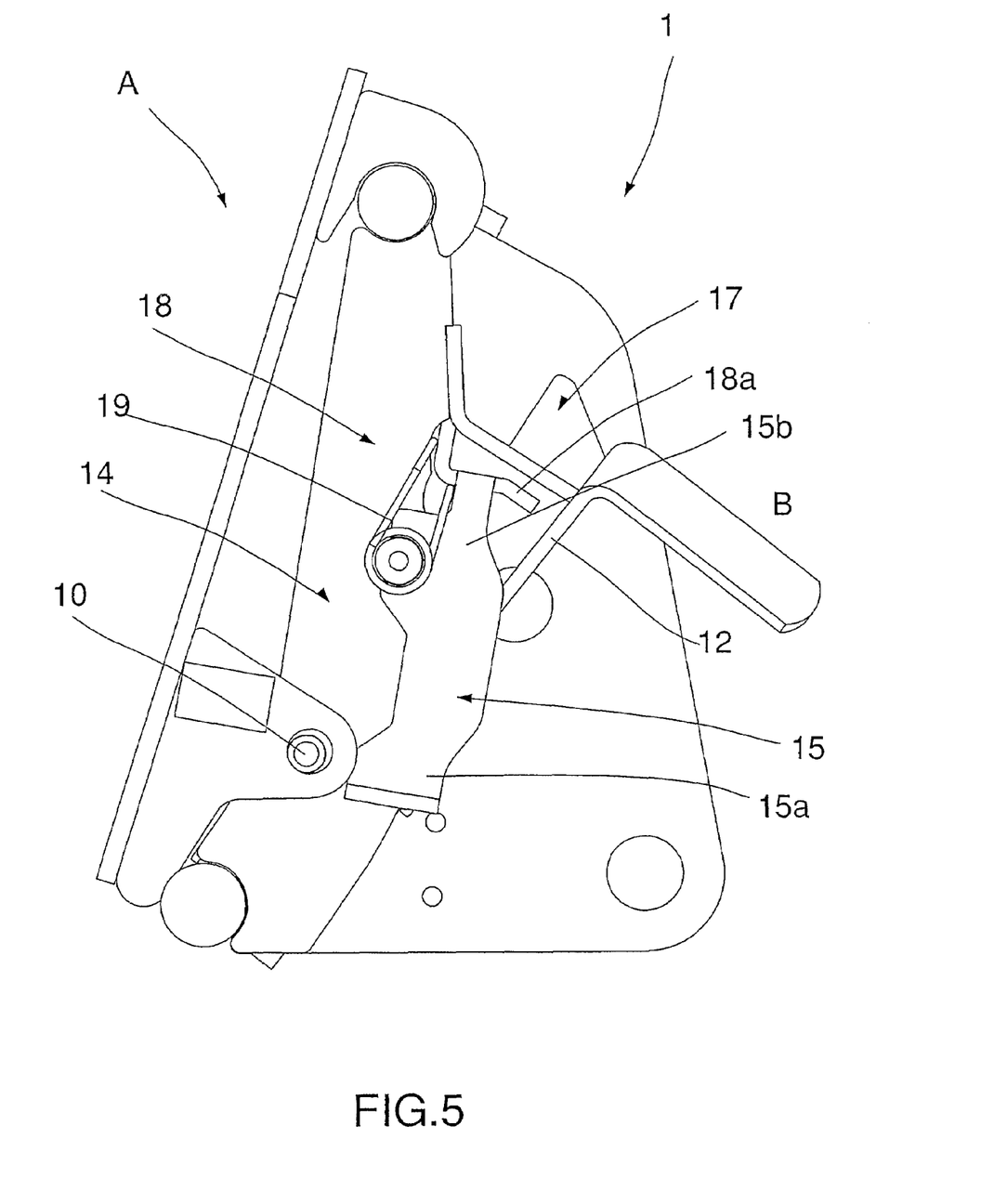
FIG. 5 shows a side view of an arrangement according to the invention in its open position and with one lock-retaining part in its active position. See also FIG. 2.
Figure 7:
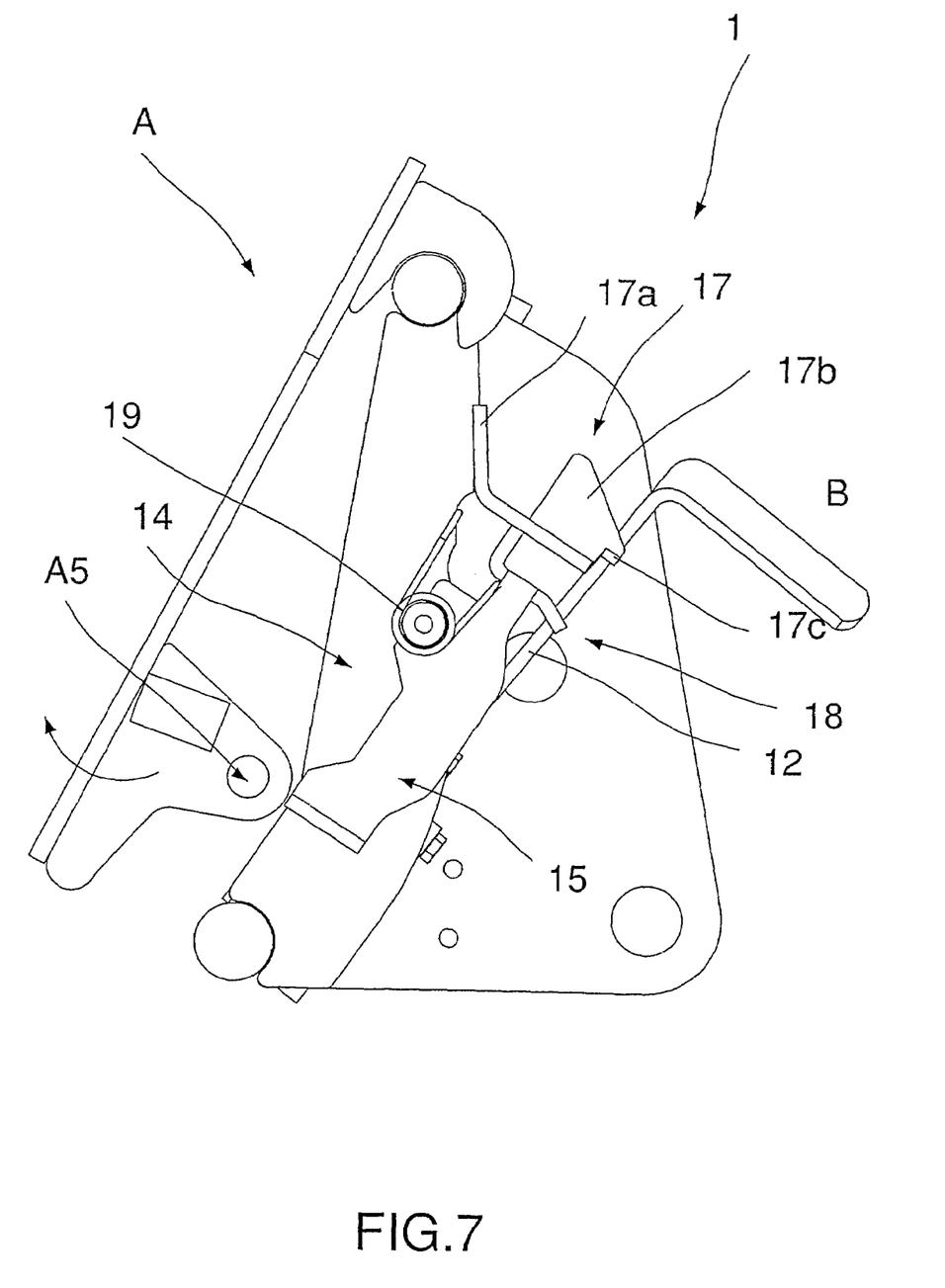
FIG. 7 shows a side view of an arrangement according to the invention where the lock-retaining part of the attachment has taken up its inactive position. See also FIG. 3.
Figure 8:
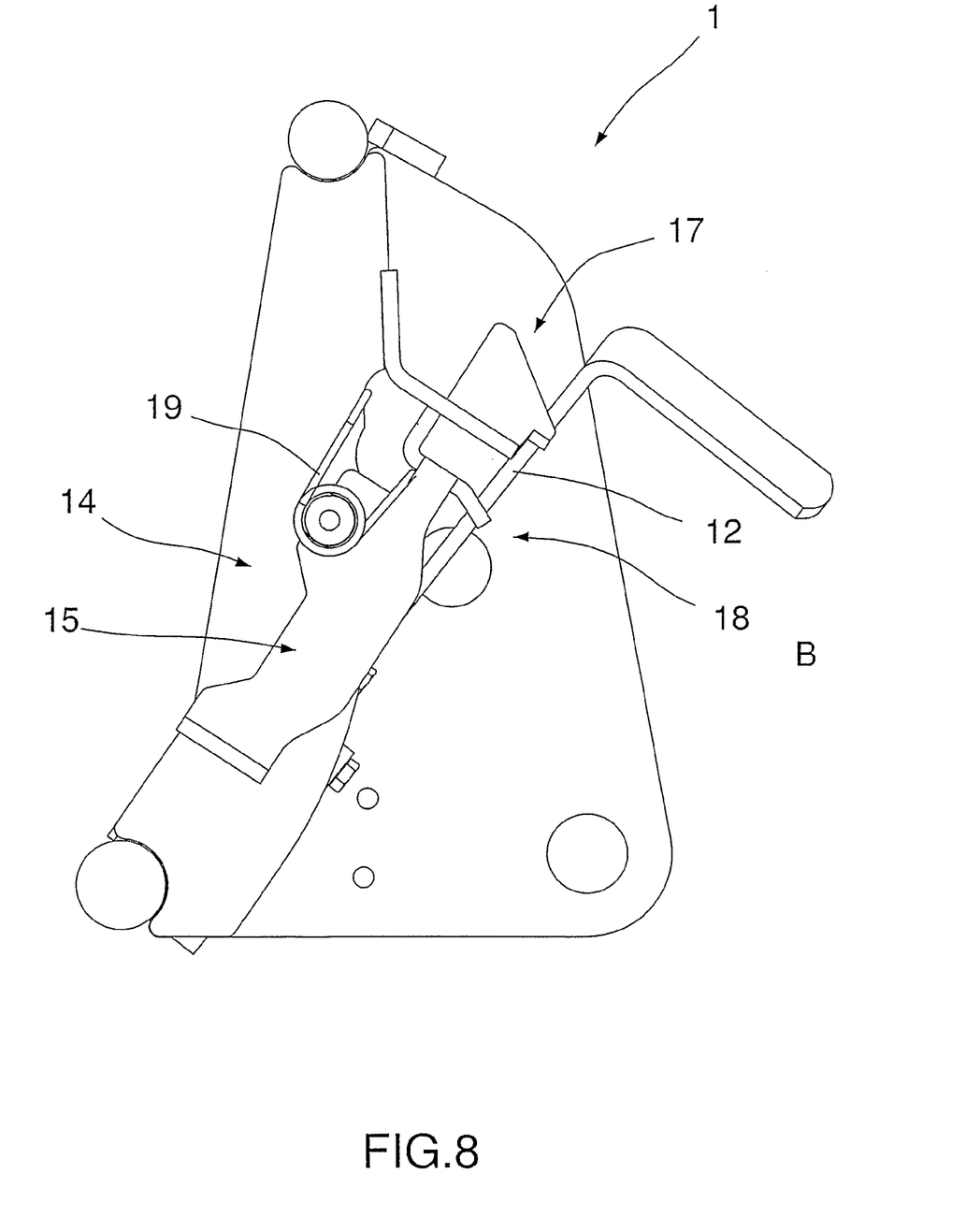
FIG. 8 shows a side view of an arrangement according to the invention where a tool has been fully removed and is not shown. A safety arrangement is present in its active position.
Figure 9:
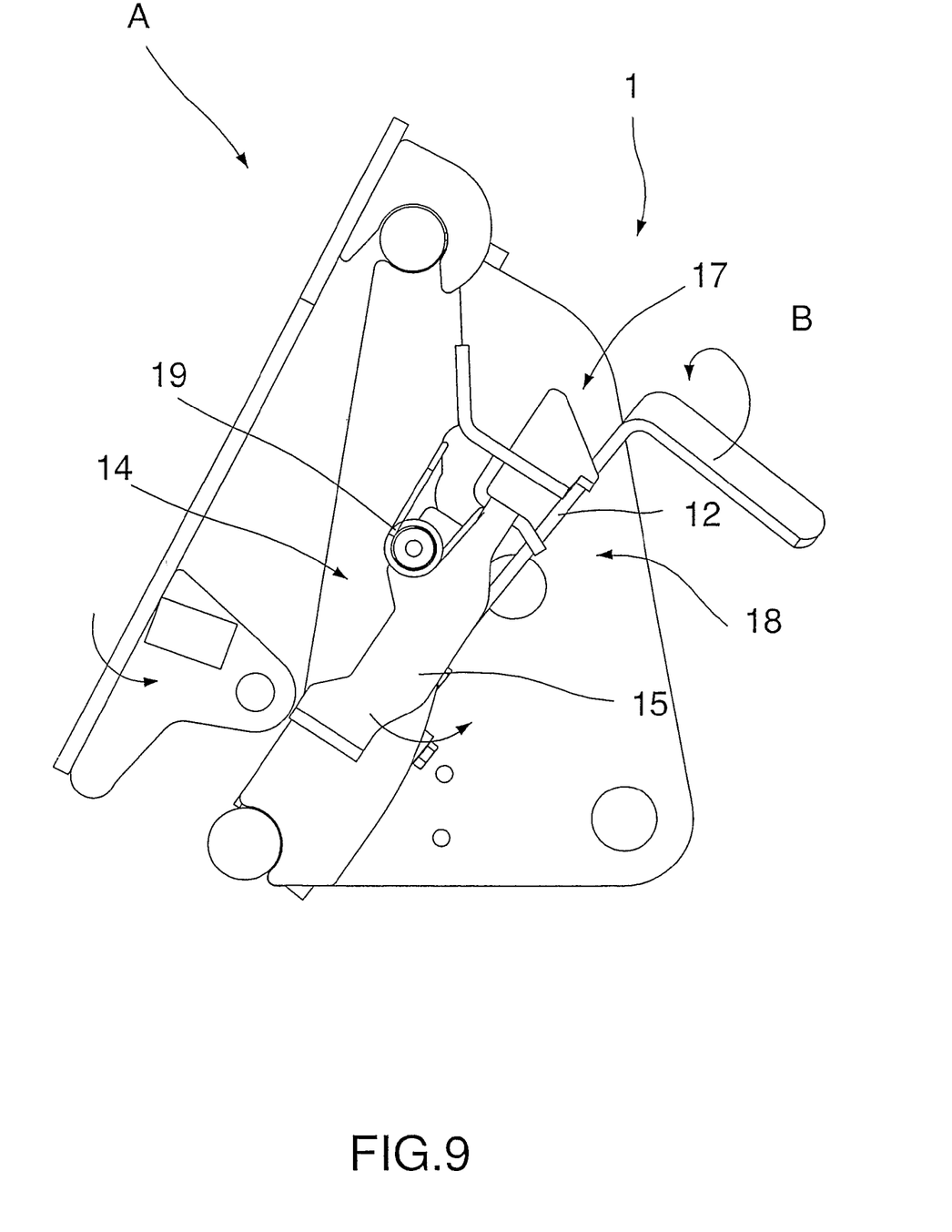
FIG. 9 shows a side view of an arrangement according to the invention where mounting of a tool has just been initiated and deactivation of the safety arrangement has begun.
Figure 10:
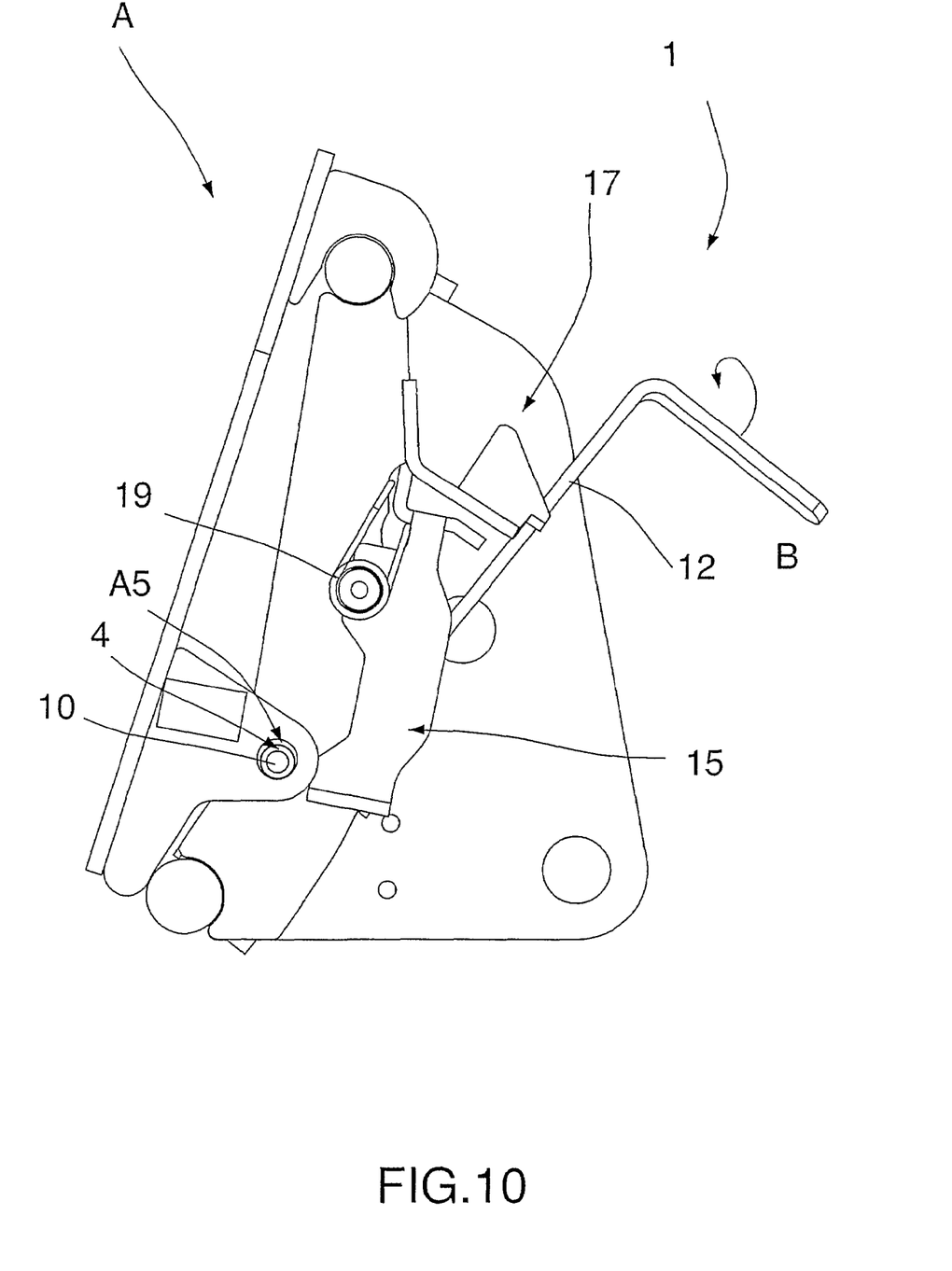
FIG. 10 shows a side view of an arrangement according to the invention in which a safety arrangement has adopted its inactive position such that the locking arrangement can adopt its locked position.

Now that the loader and its attachment arrangement 1 have been driven towards the tool A, or a second tool, the safety arrangement 14, the latch 15, will be displaced from its active position, from the position in which it covers the holes 4 and A5, see FIGS. 3, 7 and 8, to its inactive position, see FIGS. 1, 4 and 5.

When the safety arrangement 14 no longer prevents displacement of the locking arrangement to its locked position and the part 12 that transfers force, the part 13b that produces force, can freely influence the locking parts 10, the locking arrangement 9 can take up its locked position with the locking parts 10 inserted into the holes 4 and A5 such that the tool A is fixed attached and locked onto the attachment arrangement 1 of the loader.

It should be understood that the invention is not limited to the special fittings that have been described. These constitute solely an example, and it should be realised that several variations and modifications can be made within the innovative concept that is defined by the attached patent claims.

The invention claimed is:

1. An attachment arrangement for a loader that makes it possible to automatically attach a tool in a correctly arranged position to the loader, the attachment arrangement comprising:
    a locking arrangement to determine the correctly arranged position of the tool and to lock the tool in the correctly arranged position to the attachment arrangement;
    a safety arrangement pivotably attached to the attachment arrangement to ensure that the locking arrangement takes up its locking position only when a tool is in the correctly arranged position at the attachment arrangement;
    a part that stores force is arranged to interact with the safety arrangement with a force in the direction towards its active position;
    a retaining part, independent of the locking arrangement, to retain the locking arrangement in an open position in which it does not perform the locking function; and
    a releasing part attached to the safety arrangement to release the locking arrangement from the retaining part and which is activated to work at the same time as the attachment arrangement is moved away from the tool and the safety arrangement is released from an influencing force of the tool and is moved to an active position where the safety arrangement prevents the locking arrangement to get into locking position,
    wherein, upon engagement between the tool and the safety arrangement, the safety arrangement is moved from the active position to an inactive position in which the safety arrangement allows the locking arrangement to be brought into its locked position.

2. The attachment arrangement according to claim 1, in which the retaining part is mounted on the rear of the attachment arrangement, on that side of the attachment arrangement that faces the loader.

3. The attachment arrangement according to claim 1, in which the retaining part comprises an arm construction that is mounted at one of its ends to the attachment arrangement and whose free second end can be brought into retaining interaction with the locking arrangement.

4. The attachment arrangement according to claim 3, in which the free end has a concavity in which a part of the locking arrangement is arranged and there retained.

5. The attachment arrangement according to claim 4, in which the part of the locking arrangement that transfers force is arranged and retained in the concavity of the retaining part.

6. The attachment arrangement according to claim 1, in which the releasing part is arranged such that it can be displaced towards the locking arrangement in order to guide the locking arrangement away from the retaining part.

7. The attachment arrangement according to claim 6, in which the releasing part comprises a protruding part that can be placed in contact with the locking arrangement.

8. The attachment arrangement according to claim 1, in which the safety arrangement interacts when in the active position with the locking arrangement and prevents the displacement of the locking arrangement to a position in which the locking arrangement interacts with the attachment arrangement of the loader and with the tool.

9. A method in which a tool is to be removed from a loader having an attachment arrangement, the method comprising:
    placing the tool at the location at which it is to be left, arranged on the attachment arrangement,
    opening a locking arrangement such that the attachment arrangement and the tool are no longer locked to each other,
    engaging the locking arrangement with a retaining part to retain the locking arrangement in its open position,
    displacing the loader and its attachment arrangement away from the tool,
    subsequently releasing a safety arrangement from a force from the tool and influencing the safety arrangement by a part that stores force such that it takes up an active position in which the safety arrangement prevents the locking arrangement from taking up its locked position, and
    influencing the locking arrangement by a releasing part, which also is influenced by the part that stores force, such that the releasing part moves towards the locking arrangement and displaces the locking arrangement away from the retaining part such that the locking arrangement is no longer retained by the retaining part whereby only the safety arrangement prevents the locking arrangement from taking up its locked position.

* * * * *